(12) United States Patent
Hwang

(10) Patent No.: US 9,120,467 B2
(45) Date of Patent: Sep. 1, 2015

(54) ELECTRO-HYDRAULIC BRAKE AND CONTROL METHOD THEREOF

(75) Inventor: Yong Suk Hwang, Seoul (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 809 days.

(21) Appl. No.: 13/359,286

(22) Filed: Jan. 26, 2012

(65) Prior Publication Data

US 2012/0192555 A1 Aug. 2, 2012

(30) Foreign Application Priority Data

Jan. 27, 2011 (KR) ........................ 10-2011-0008028

(51) Int. Cl.
| F16B 7/00 | (2006.01) |
| B60T 13/20 | (2006.01) |
| B60T 1/10 | (2006.01) |
| B60T 7/04 | (2006.01) |
| B60T 13/58 | (2006.01) |

(52) U.S. Cl.
CPC . *B60T 1/10* (2013.01); *B60T 7/042* (2013.01); *B60T 13/585* (2013.01)

(58) Field of Classification Search
CPC ................................. B60T 1/10; B60T 13/585
USPC .................... 60/545, 553, 554, 576
See application file for complete search history.

(56) References Cited

U.S. PATENT DOCUMENTS

| 6,957,871 B2 | 10/2005 | Maki | |
| 8,833,072 B2 * | 9/2014 | Sprocq et al. | .................. 60/545 |
| 2009/0108670 A1 | 4/2009 | Ohlig | |
| 2009/0212622 A1 | 8/2009 | Yang | |
| 2010/0084915 A1 * | 4/2010 | Crombez et al. | .............. 303/155 |

FOREIGN PATENT DOCUMENTS

| CN | 101513866 A | 8/2009 |
| JP | 2006-193107 | 7/2006 |

(Continued)

OTHER PUBLICATIONS

Chinese Office Action, w/ English translation thereof, issued in Chinese Patent Application No. CN 201210019960.3 dated Jan. 20, 2014.

(Continued)

*Primary Examiner* — Edward Look
*Assistant Examiner* — Daniel Collins
(74) *Attorney, Agent, or Firm* — McDermott Will & Emery LLP

(57) ABSTRACT

Disclosed herein are an electro-hydraulic brake and a control method thereof which provide hydraulic braking force to transfer a stable pedal feel and provide regenerative braking to improve fuel efficiency. The electro-hydraulic brake includes a master cylinder, a housing including a booster chamber and a base chamber, an oil reservoir, a hydraulic control unit connected to the oil reservoir, a simulation unit, and a pedal displacement sensor. The hydraulic control unit includes an accumulator, a pump to absorb oil from the oil reservoir and to discharge the oil to the accumulator, a motor to drive the pump, a normal cut valve, a simulation control valve, two control valves to control the pressure in the booster chamber, pressure sensors to sense the pressures in the base chamber, the accumulator and the booster chamber, and a controller to control the motor and the valves based on pressure information and pedal displacement information.

5 Claims, 4 Drawing Sheets

(56) References Cited

FOREIGN PATENT DOCUMENTS

| | | | |
|---|---|---|---|
| KR | 2009-0121927 A | | 11/2009 |
| WO | WO 2010006978 A1 | * | 1/2010 |

OTHER PUBLICATIONS

Korean Office Action issued in Korean Patent Application No. 10-2011-0008028 dated Aug. 6, 2012.

* cited by examiner

ELECTRO-HYDRAULIC BRAKE AND CONTROL METHOD THEREOF

CROSS-REFERENCE TO RELATED APPLICATION

This application claims the benefit of Korean Patent Application No. 2011-0008028, filed on Jan. 27, 2011 in the Korean Intellectual Property Office, the disclosure of which is incorporated herein by reference.

BACKGROUND

1. Field

Embodiments of the present invention relate to an electro-hydraulic brake and a control method thereof which provide hydraulic braking force to transfer a stable pedal feel and provide regenerative braking to improve fuel efficiency.

2. Description of the Related Art

Recently, hybrid vehicles, fuel cell vehicles and electric vehicles to improve fuel efficiency and to reduce exhaust gas have been vigorously developed. In each of such vehicles, a braking device, i.e., a brake for vehicles is essentially installed. Such a brake for vehicles is referred to a device functioning to decelerate or stop a driving vehicle.

In general, brakes for vehicles are classified into a vacuum brake generating braking force using suction pressure of an engine, and a hydraulic brake generating braking force using hydraulic pressure.

The vacuum brake exhibits large braking force with a little force using a difference between suction pressure of a vehicle engine and atmospheric pressure in a vacuum booster. That is, the vacuum brake generates greater output than force applied to a brake pedal when a driver presses the pedal.

In such a conventional vacuum brake, suction pressure of the vehicle engine needs to be supplied to the vacuum booster to form a vacuum, and thus fuel efficiency may be reduced. Further, the engine needs to be operated at all times to form the vacuum even when the vehicle is stopped.

Further, since a fuel cell vehicle or an electric vehicle does not include an engine, the conventional vacuum brake amplifying foot effort of a driver during braking is not applicable to the fuel cell vehicle or the electric vehicle. Moreover, since a hybrid vehicle executes an idle rotation stopping function during stoppage to improve fuel efficiency, introduction of the hydraulic brake into the hybrid vehicle is required.

That is, all vehicles require implementation of regenerative braking to improve fuel efficiency, as described above, and thus implementation of regenerative braking is facilitated by introduction of the hydraulic brake.

In the case of an electro-hydraulic brake which is a kind of hydraulic brake, when a driver presses a pedal, a controller senses pressing of the pedal, supplies hydraulic pressure to a master cylinder, and transmits braking hydraulic pressure to wheel cylinders of respective wheels to generate braking force.

Such an electro-hydraulic brake is configured to be easily controllable, but an improved electro-hydraulic brake satisfying user requirements, such as safety of a vehicle during braking, improvement of fuel efficiency, proper pedal feel, etc., is needed.

Therefore, research and development of an electro-hydraulic brake having a simple configuration, providing braking force even when malfunction occurs and being easily controlled is underway.

SUMMARY

Therefore, it is an aspect of the present invention to provide an electro-hydraulic brake which improves safety in braking and a mounting property on a vehicle, has a simple configuration and provides stable pedal feel during braking and regenerative braking to improve fuel efficiency, and a control method thereof.

Additional aspects of the invention will be set forth in part in the description which follows and, in part, will be obvious from the description, or may be learned by practice of the invention.

In accordance with one aspect of the present invention, an electro-hydraulic brake includes a master cylinder having two hydraulic circuits and generating hydraulic pressure, a housing including a booster chamber contacting the master cylinder to compress the master cylinder, and a base chamber including a piston moving by foot effort of a driver and generating pressure based on displacement of the piston due to the foot effort, an oil reservoir connected to the upper portion of the master cylinder to store oil, a hydraulic control unit connected to the oil reservoir to generate hydraulic pressure, a simulation unit to provide reaction force of the pedal, and a pedal displacement sensor to sense displacement of the pedal, wherein the hydraulic control unit includes an accumulator to store a designated level of pressure to supply the pressure to the booster chamber, a pump to absorb the oil from the oil reservoir and to discharge the oil to the accumulator to form pressure in the accumulator, a motor to drive the pump, a normal cut valve to control connection between the base chamber and the booster chamber, a simulation control valve to control connection between the base chamber and the simulation unit, two control valves to control the pressure in the booster chamber, pressure sensors to sense the pressures in the base chamber, the accumulator and the booster chamber, and a controller to control the motor and the valves based on pressure information and pedal displacement information.

The normal cut valve may be a normal open-type solenoid valve which is opened in a normal state, and is closed when the valve receives a close signal from the controller, and a check valve allowing the oil to flow from the base chamber to the booster chamber may be provided in parallel with the normal cut valve between the base chamber and the booster chamber.

The two control valves may include a compression control valve controlling the flow of oil supplied from the accumulator to the booster chamber and a decompression control valve controlling the flow of oil connected from the booster chamber to the oil reservoir, and each of the compression control valve and the decompression control valve may be a normal close-type solenoid valve which is closed in a normal state, and is opened when the valve receives an open signal from the controller.

The simulation control valve may be a normal close-type solenoid valve which is closed in a normal state, and is opened when the valve receives an open signal from the controller.

The pressure sensors may include a first pressure sensor to measure the pressure in the base chamber, a second pressure sensor to measure the pressure in the accumulator, and a third pressure sensor to measure the pressure in the booster chamber.

In accordance with another aspect of the present invention, a control method of an electro-hydraulic brake includes judging displacement of a pedal by a pedal displacement sensor, and comparing pressure in a base chamber to pressure of the pedal displacement sensor and judging whether or not the electro-hydraulic brake is normally operated by a controller to control a normal cut valve connected between the base chamber and a booster chamber, a simulation control valve connected between the base chamber and a simulation unit, and a compression control valve and a decompression control valve controlling the flow of oil in the booster chamber.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
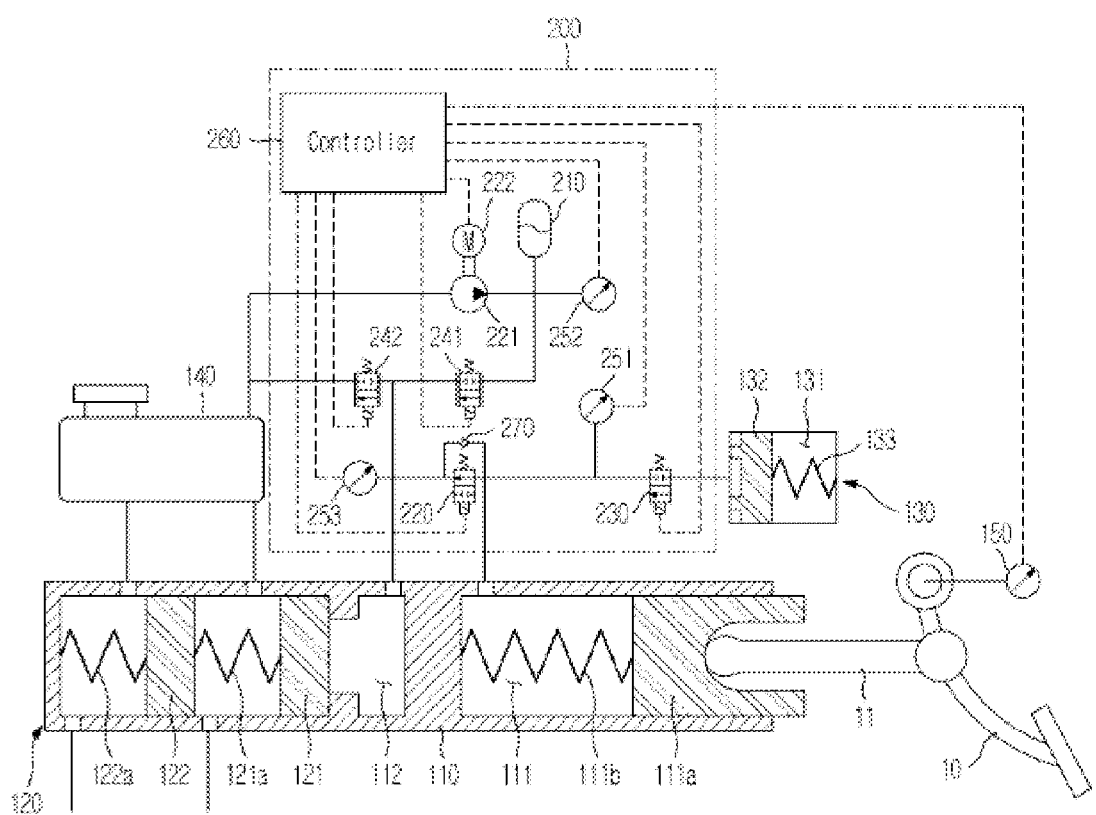
FIG. 1 is a circuit diagram illustrating an electro-hydraulic brake and a control method thereof in accordance with one embodiment of the present invention.

Reference will now be made in detail to the embodiments of the present invention, examples of which are illustrated in the accompanying drawings, wherein like reference numerals refer to like elements throughout. The terms used in the following description are terms defined taking into consideration the functions obtained in accordance with the embodiments, and the definitions of these terms should be determined based on the overall content of this specification. The configurations disclosed in the embodiments and the drawings of the present invention are only exemplary and do not include all of the technical spirit of the invention, and thus it will be appreciated that the embodiments may be variously modified and changed.

An electro-hydraulic brake in accordance with one embodiment of the present invention, as shown in FIG. 1, includes a housing 110 provided with a booster chamber 112 and a base chamber 111, a master cylinder 120 connected to the housing 110, an oil reservoir 140 connected to the master cylinder 120 to store oil, a hydraulic control unit 200 connected to the oil reservoir 140 to generate hydraulic pressure, a simulation unit 130 to provide reaction force of a pedal 10, and a pedal displacement sensor 150 to sense displacement of the pedal 10.

A piston 111a, moving forward by foot effort of a driver, is provided in the base chamber 111 provided at one side of the housing 110. Thereby, pressure is formed in the base chamber 111 according to displacement of the piston 111a due to foot effort.

The piston 111a contacts a push rod 11 installed on the pedal 10, and slidably moves forward and backward together with the push rod 111 by foot effort of the pedal 10. Here, a spring 111b is provided within the base chamber 111 so as to return the piston 111a to its original position when foot effort is released.

The booster chamber 112 is provided between the master cylinder 120 and the base chamber 111 and serves to compress the master cylinder 120 by pressure generated from the base chamber 111. Such a booster chamber 112 receives oil of a high pressure during normal braking, and moves pistons 121 and 122 provided within the master cylinder 120. That is, the booster chamber 112 is a space to receive oil of the high pressure, and, when oil of the high pressure generated by the hydraulic control unit 200 is supplied to the booster chamber 112, moves the pistons 121 and 122 within the master cylinder 120 due to the oil of the high pressure to compress the oil within the master cylinder 120 and thus to transmit hydraulic pressure to wheel cylinders (not shown) and to generate braking force.

The master cylinder 120 is provided with a first piston 121 and a second piston 122 formed therein so as to form two hydraulic circuits, and generates hydraulic pressure due to the above-described pressure generated by the booster chamber 112. The reason why the master cylinder 120 has the two hydraulic circuits is to assure safety in the event of malfunction. For example, one circuit from among the two hydraulic circuits is connected to a right front wheel and a left rear wheel of a vehicle, and the other is connected to a left front wheel and a right rear wheel of the vehicle. Otherwise, one circuit from among the two hydraulic circuits may be connected to two front wheels, and the other may be connected to two rear wheels. In such a manner, two independent circuits serve to enable braking of the vehicle even if one circuit malfunctions.

A first spring 121a and a second spring 122a are provided on the first piston 121 and the second piston 122 of the master cylinder 120. The first spring 121a and the second spring 122a store elastic force while the first piston 121 and the second piston 122 are compressed. Such elastic force pushes the first and second pistons 121 and 122 to return their original positions when pushing force of the first piston 121 is smaller than the elastic force.

The pedal displacement sensor 150 is installed on the pedal 10 to sense displacement of the pedal 10. A signal sensed by the pedal displacement sensor 150 is transmitted to a controller 260, which will be described later, and the controller 260 measures the displacement of the pedal 10 and controls a plurality of valves 220, 230, 241 and 242 provided in the hydraulic control unit 200 to control a flow of hydraulic pressure. Control operation of the plural valves 220, 230, 241 and 242 according to the displacement of the pedal 10 will be described later.

The pedal displacement sensor 150 may be a variable resistance-type stroke sensor or a rotation angle sensor.

The simulation unit 130 is provided with a simulation chamber 131, and a reaction piston 132 and a reaction spring 133 are provided within the simulation chamber 131. That is, when a driver presses the pedal 10, pressure generated by movement of the piston 111a within the base chamber 111 together with movement of the push rod 11 moves the reaction piston 132 of the simulation unit 130 to elastically compress the reaction spring 133. Elastic force generated by compression of the reaction spring 133 provides reaction force to the piston 111a and the push rod 11, thereby providing proper pedal feel to the driver.

The oil reservoir 140 is connected to the upper portion of the master cylinder 120 and supplies oil to the master cylinder 120 and the hydraulic control unit 200. An outlet through which the oil is discharged is provided on the oil reservoir 140, and thus the oil is supplied to the master cylinder 120 through the outlet.

The hydraulic control unit 200 compresses the oil supplied from the oil reservoir 140 and then supplies the oil to the booster chamber 112.

In more detail, the hydraulic control unit 200 includes a pump 221 which absorbs the oil from the oil reservoir 140 and discharges the oil to an accumulator 210 to form pressure in the accumulator 210 and a motor 222 to drive the pump 221, and oil of a high pressure compressed by the pump 221 is stored in the accumulator 210. That is, the accumulator 210 stores the oil to have a designated level of pressure to supply the pressure to the booster chamber 112.

The hydraulic control unit 200 further includes a normal cut valve 220 to control connection between the base chamber 111 and the booster chamber 112, a simulation control valve 230 to control connection between the base chamber 111 and the simulation unit 130, two control valves 241 and 242 to control pressure of the booster chamber 112, and the controller 260 to control the valves 220, 230, 241 and 242.

The normal cut valve 220 is a normal open-type (hereinafter, referred to as 'NO-type') solenoid valve which is opened in a normal state, and is closed when the valve receives a close signal from the controller 260 during braking.

Here, in consideration of sticking of the normal cut valve 220, a check valve 270 parallel with the normal cut valve 220 is provided between the base chamber 111 and the booster chamber 112 so as to enable braking force to flow in the direction from the base chamber 111 to the booster chamber 112.

Further, each of the simulation control valve 230 and the two control valves 241 and 242 controlling pressure of the booster chamber 112 is a normal close-type (hereinafter, referred to as 'NC-type') solenoid valve which is closed in a normal state, and is opened when the valve receives an open signal from the controller 260 during braking.

Here, the two control valves 241 and 242 controlling pressure of the booster chamber 112 include a compression control valve 241 controlling the flow of oil supplied from the accumulator 210 to the booster chamber 112 and a decompression control valve 242 controlling the flow of oil connected from the booster chamber 112 to the oil reservoir 140.

The hydraulic control unit 200 further includes pressure sensors 251, 252 and 253 to sense pressures of the base chamber 111, the accumulator 210 and the booster chamber 112. The pressure sensors 251, 252 and 253 include a first pressure sensor 251 to measure pressure of the base chamber 111, a second pressure sensor 252 to measure pressure of the accumulator 210, and a third pressure sensor 253 to measure pressure of the booster chamber 112. Therefore, the controller 260 controls the motor 222 and the valves 220, 230, 241 and 242 based on pressure information from the pressure sensors 251, 252 and 253 and pedal displacement information.

Hereinafter, operation of the above-described electro-hydraulic brake, i.e., in the case of normal braking and emergency braking due to malfunction of a system, will be described.

Figure 2:
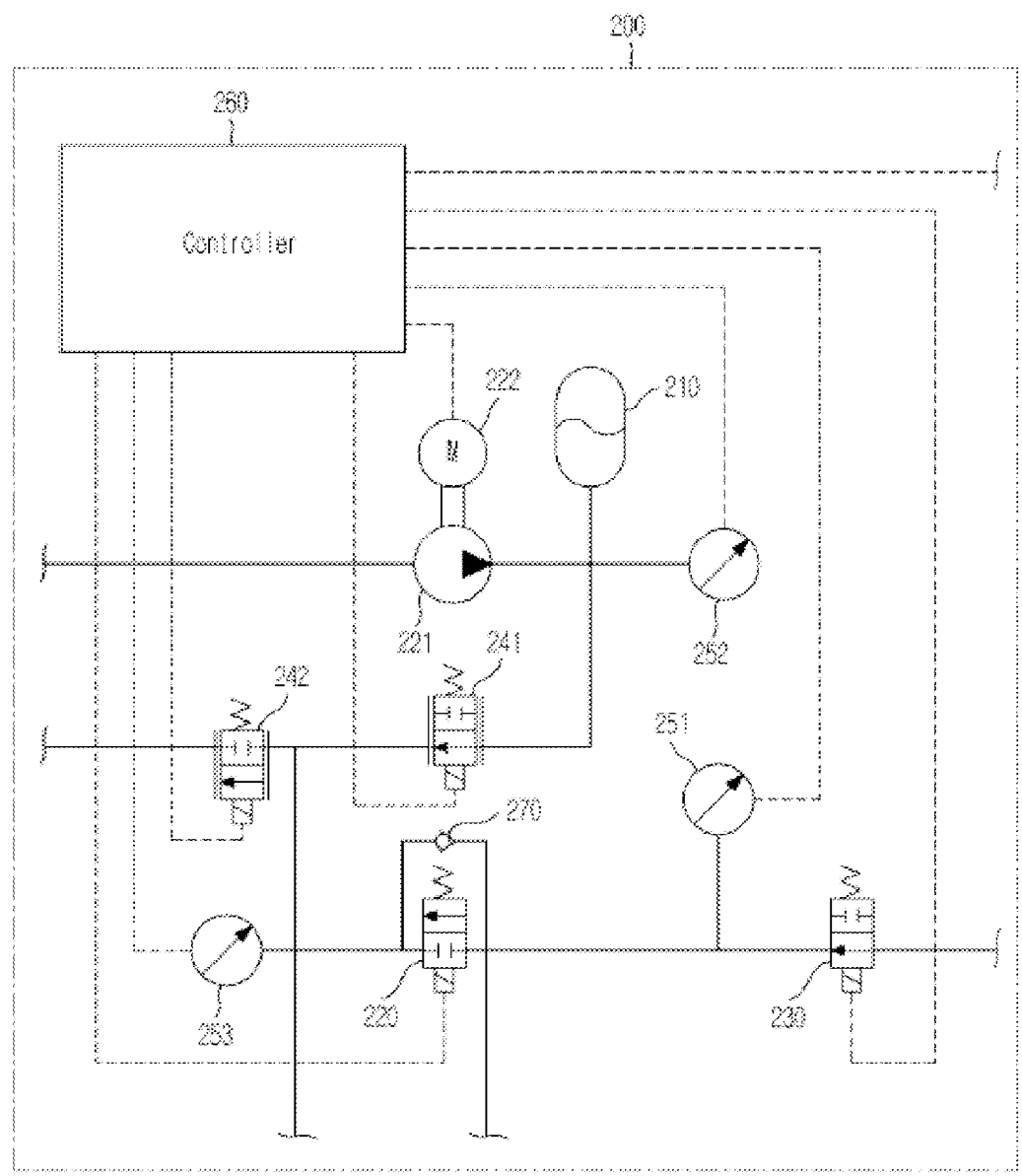
FIG. 2 is a circuit diagram illustrating operation of a hydraulic control unit if pedal displacement occurs during normal braking in the electro-hydraulic brake and the control method thereof in accordance with the embodiment of the present invention.

First, with reference to FIGS. 1 and 2, normal operation of the electro-hydraulic brake will be described.

When a driver presses the pedal 10, the push rod 11 connected to the pedal 10 moves leftward, and simultaneously, the piston 111*a* contacting the push rod 11 moves leftward.

Then, pressure of the base chamber 111 is raised, and the controller 260 receives pedal displacement information sensed by the pedal displacement sensor 150, closes the normal cut valve 220 and opens the simulation control valve 230. Thereafter, the pressure of the base chamber 111 is applied to the reaction piston 132 of the simulation unit 130 to elastically compress the reaction spring 133, and pressure formed by elastic force generated due to compression of the reaction spring 133 is transmitted to the base chamber 111 to provide proper pedal feel to the driver.

Further, the controller 260 operates the pump 221 to generate braking hydraulic pressure based on the pedal displacement information sensed by the pedal displacement sensor 150 and pressure information sensed by the first pressure sensor 251 sensing pressure of the base chamber 111. Due to such operation of the pump 221, oil of from the oil reservoir 140 is absorbed and thus oil of a high pressure is stored in the accumulator 210. Here, in order to effectively supply pressure, i.e., oil of the high pressure, to the booster chamber 112, the motor 222 is driven, the pump 221 discharges oil from the oil reservoir 140 to the accumulator 210, and a designated pressure is stored in the accumulator 210, and in order to maintain proper pressure in the accumulator 210, pressure information of the accumulator 210 is transmitted from the second pressure sensor 252 to the controller 260.

Therefore, the controller 260 calculates braking pressure corresponding to the pedal displacement, and supplies the pressure stored in the accumulator 210 to the booster chamber 112 by opening the NC-type compression control valve 241 under the condition that the NC-type decompression control valve 242 is closed, in order to supply pressure corresponding to the braking pressure to the booster chamber 112.

The booster chamber 112 is a space to receive oil of the high pressure, and, when oil of the high pressure generated by the hydraulic control unit 200 is supplied to the booster chamber 112, push the first piston 121 within the master cylinder 120 to compress the oil collected within the master cylinder 120 and thus to generate braking force.

Figure 3:
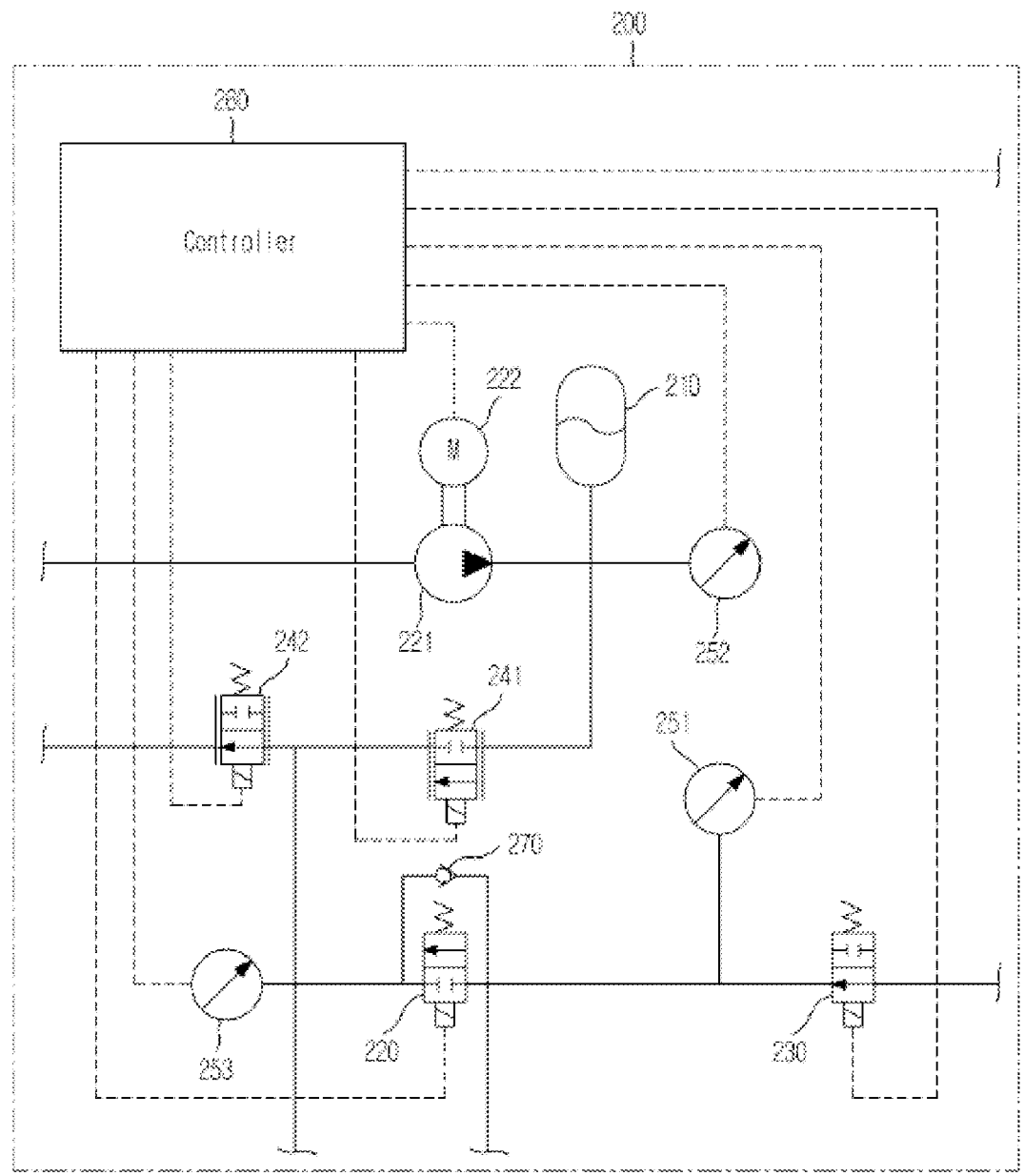
FIG. 3 is a circuit diagram illustrating operation of the hydraulic control unit if pedal displacement is reduced or removed during normal braking in the electro-hydraulic brake and the control method thereof in accordance with the embodiment of the present invention.

Then, with reference to FIGS. 1 and 3, operation of the electro-hydraulic brake if the pedal displacement generated by normal braking is reduced or removed will be described.

When the pedal 10 retracts after normal braking, the controller 260 senses displacement of the pedal 10, closes the compression control valve 241, opens the decompression control valve 242 controlling the flow of oil connected from the booster chamber 112 to the oil reservoir 140 to reduce pressure in the booster chamber 112, thereby generating braking force required by the driver. Here, in order to adjust proper pressure in the booster chamber 112, pressure information of the booster chamber 112 is transmitted from the third pressure sensor 253 to the controller 260.

When the displacement of the pedal 10 is released, the pedal 10 returns to its original position by elastic restoring force of the spring 111*b* provided in the base chamber 111.

The above-described electro-hydraulic brake always compares pressure in the base chamber 111 and pressure of the pedal displacement sensor 150 to cause the controller 260 to judge whether or not the brake is normally operated. Here, the pressure in the base chamber 111 is sensed by the first pressure sensor 251 and the sensed pressure information is transmitted to the controller 260.

Figure 4:
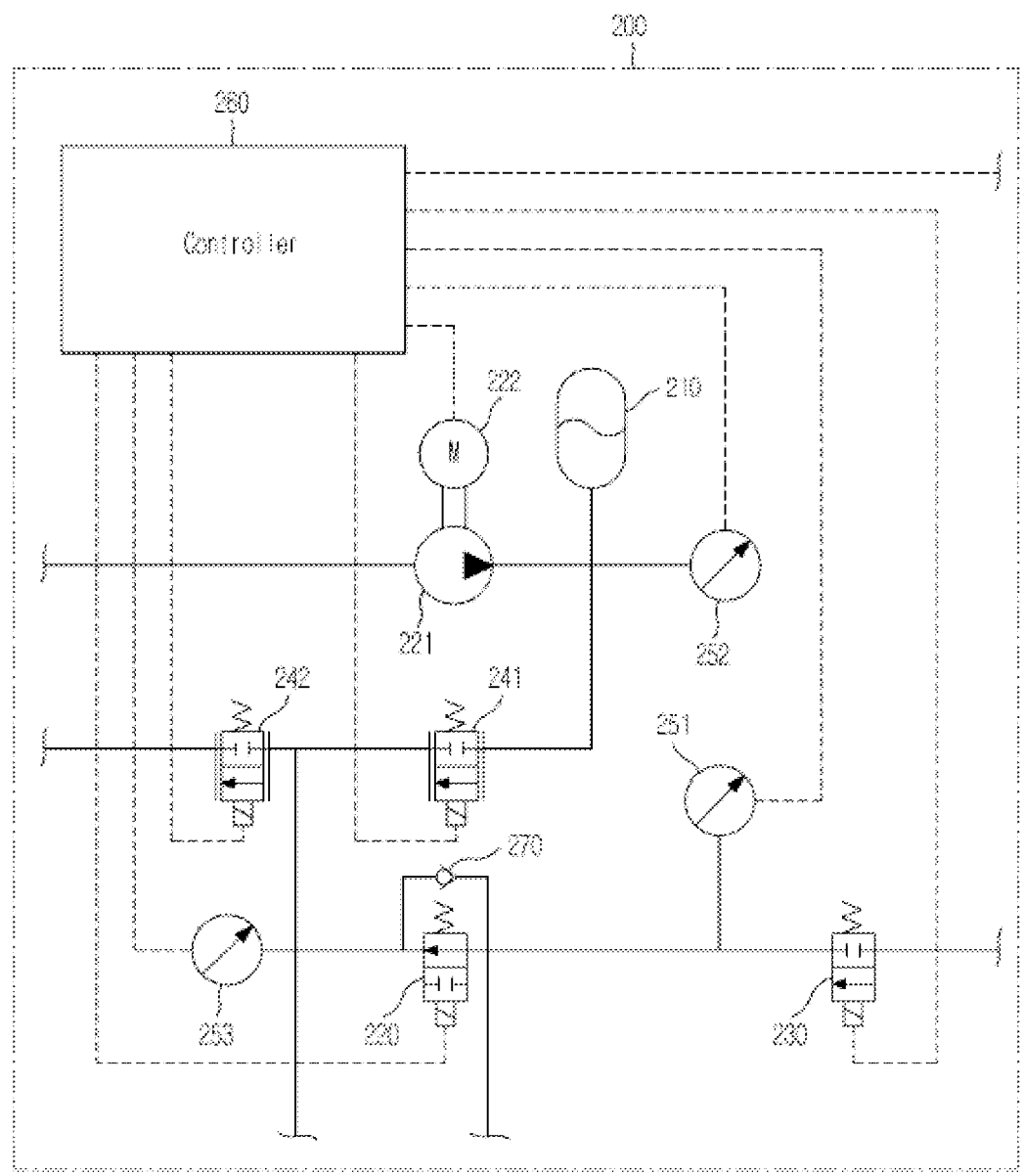
FIG. 4 is a circuit diagram illustrating operation of the hydraulic control unit if emergency braking is generated due to malfunction of a system in the electro-hydraulic brake and the control method thereof in accordance with the embodiment of the present invention.

Next, with reference to FIGS. 1 and 4, operation of the electro-hydraulic brake during emergency braking will be described.

In the case of emergency braking of the electro-hydraulic brake, when a driver presses the pedal 10, the push rod 11 connected to the pedal 10 moves leftward, and simultaneously, the piston 111*a* contacting the push rod 11 moves leftward and thus pressure in the base chamber 111 is raised.

Then, the closing state of the NC-type simulation control valve 230 is maintained, the NO-type normal cut valve 220 is opened, the NC-type compression control valve 241 and decompression control valve 242 are closed, and thus the pressure in the base chamber 111 generated by foot effort of the driver is transmitted to the booster chamber 112. Such pressures pushes the second piston 122 in the master cylinder 120 and thus compresses oil within the master cylinder 120, thereby generating braking hydraulic pressure. Such braking hydraulic pressure is transmitted to wheel cylinders and thus generates braking force. In consideration of sticking of the normal cut valve 220, the check valve 270 enabling a flow of brake force in the direction from the base chamber 111 to the booster chamber 112 is provided in parallel with the normal cut valve 220.

In order to execute regenerative braking of the electro-hydraulic brake during normal braking, the electro-hydraulic brake in accordance with the embodiment of the present invention may control the pressure in the master cylinder 120 and the pressure of the wheel cylinders by randomly controlling the pressure in the booster chamber 112. Since the pressure in the base chamber 111 and the pressure in the booster chamber 112 are separated by the normal cut valve 220, the driver may receive stable pedal feel through the simulation unit 130 although the controller 260 increases or decreases the pressure in the booster chamber 112.

As is apparent from the above description, an electro-hydraulic brake and a control method thereof in accordance with one embodiment of the present invention may produce braking force required by a driver regardless of presence or absence of an engine and operation and non-operation of the engine, thereby improving fuel efficiency.

Further, the electro-hydraulic brake and the control method thereof may maintain stable pedal feel transmitted to a driver although pressure during braking is randomly adjusted.

Further, the electro-hydraulic brake has a simple configuration as compared with a conventional negative pressure type booster, thus being easily applied to a small vehicle.

Additionally, the electro-hydraulic brake and the control method thereof enable braking of a vehicle even when the brake system malfunctions, thus being easily applied to an electric vehicle, a fuel cell vehicle and a hybrid vehicle.

Moreover, the electro-hydraulic brake and the control method thereof do not use suction pressure of an engine differently from a vacuum brake and thus may improve fuel efficiency of a vehicle, and simplify the configuration of the electro-hydraulic brake and thus may be easily applied to a small vehicle.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electro-hydraulic brake comprising:
   a master cylinder having two hydraulic circuits and generating hydraulic pressure;
   a housing including a booster chamber contacting the master cylinder to compress the master cylinder, and a base chamber including a piston moving by foot effort of a driver and generating pressure based on displacement of the piston due to the foot effort;
   an oil reservoir connected to the upper portion of the master cylinder to store oil;
   a hydraulic control unit connected to the oil reservoir to generate hydraulic pressure;
   a simulation unit to provide reaction force of the pedal; and
   a pedal displacement sensor to sense displacement of the pedal,
   wherein the hydraulic control unit includes an accumulator to store a designated level of pressure to supply the pressure to the booster chamber, a pump to absorb the oil from the oil reservoir and to discharge the oil to the accumulator to form pressure in the accumulator, a motor to drive the pump, a normal cut valve to control connection between the base chamber and the booster chamber, a simulation control valve to control connection between the base chamber and the simulation unit, two control valves to control the pressure in the booster chamber, pressure sensors to sense the pressures in the base chamber, the accumulator and the booster chamber, and a controller to control the motor and the valves based on pressure information and pedal displacement information, and
   wherein the pressure sensors include a first pressure sensor to measure the pressure in the base chamber, a second pressure sensor to measure the pressure in the accumulator, and a third pressure sensor to measure the pressure in the booster chamber.

2. The electro-hydraulic brake according to claim 1, wherein:
   the normal cut valve is a normal open-type solenoid valve which is opened in a normal state and is closed when the valve receives a close signal from the controller; and
   a check valve allowing the oil to flow from the base chamber to the booster chamber is provided in parallel with the normal cut valve between the base chamber and the booster chamber.

3. The electro-hydraulic brake according to claim 1, wherein:
   the two control valves include a compression control valve controlling the flow of oil supplied from the accumulator to the booster chamber and a decompression control valve controlling the flow of oil connected from the booster chamber to the oil reservoir; and
   each of the compression control valve and the decompression control valve is a normal close-type solenoid valve which is closed in a normal state and is opened when the valve receives an open signal from the controller.

4. The electro-hydraulic brake according to claim 1, wherein the simulation control valve is a normal close-type solenoid valve which is closed in a normal state and is opened when the valve receives an open signal from the controller.

5. A control method of an electro-hydraulic brake comprising:
   judging displacement of a pedal by a pedal displacement sensor; and
   comparing pressure in a base chamber to pedal displacement information of the pedal displacement sensor and judging whether or not the electro-hydraulic brake is normally operated by a controller to control a normal cut valve connected between the base chamber and a booster chamber, a simulation control valve connected between the base chamber and a simulation unit, and a compression control valve and a decompression control valve controlling the flow of oil in the booster chamber.

* * * * *